United States Patent
Tarasuk-Levin et al.

(10) Patent No.: US 9,547,600 B2
(45) Date of Patent: Jan. 17, 2017

(54) METHOD AND SYSTEM FOR RESTORING CONSUMED MEMORY AFTER MEMORY CONSOLIDATION

(71) Applicant: VMware, Inc., Palo Alto, CA (US)

(72) Inventors: Gabriel Tarasuk-Levin, Sunnyvale, CA (US); Anne Holler, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 141 days.

(21) Appl. No.: 14/447,238

(22) Filed: Jul. 30, 2014

(65) Prior Publication Data

US 2015/0039838 A1  Feb. 5, 2015

Related U.S. Application Data (60) Provisional application No. 61/860,186, filed on Jul. 30, 2013.

(51) Int. Cl.
*G06F 12/08* (2016.01)
*G06F 12/12* (2016.01)

(52) U.S. Cl.
CPC ............ *G06F 12/0862* (2013.01); *G06F 12/08* (2013.01); *G06F 12/0868* (2013.01); *G06F 12/12* (2013.01); *G06F 2212/1024* (2013.01); *G06F 2212/151* (2013.01); *G06F 2212/152* (2013.01); *G06F 2212/6022* (2013.01)

(58) Field of Classification Search
None
See application file for complete search history.

(56) References Cited

U.S. PATENT DOCUMENTS

2007/0157001 A1* 7/2007 Ritzau ............... G06F 12/08
711/170
2015/0039838 A1* 2/2015 Tarasuk-Levin .... G06F 12/0862
711/137

* cited by examiner

*Primary Examiner* — Midys Rojas (57) ABSTRACT

One embodiment of the system disclosed herein facilitates reduction of latency associated with accessing content of a memory page that has been swapped out by a guest operating system in a virtualized computer system. During operation, a hypervisor detects an I/O write command issued by the guest operating system at a swap location within the guest operating system's swap file and records the swap location. The hypervisor then prefetches contents of a page stored at the swap location within the guest operating system's swap file into a prefetch cache in host machine memory. Subsequently, the hypervisor detects an I/O read command issued by the guest operating system at the swap location within the swap file. In response, the hypervisor provides contents of the page to the guest operating system from the prefetch cache, thereby avoiding accessing the guest operating system's swap file.

18 Claims, 7 Drawing Sheets

METHOD AND SYSTEM FOR RESTORING CONSUMED MEMORY AFTER MEMORY CONSOLIDATION

CROSS REFERENCE TO RELATED APPLICATIONS

This application is entitled to the benefit of U.S. Provisional Patent Application Ser. No. 61/860,186, filed on Jul. 30, 2013, which is incorporated herein by reference.

BACKGROUND

The development of virtualization technologies has made it possible to execute multiple virtual machines (VMs, also called "guests") on a single host machine. Virtualization software may execute on a host machine to support the execution of the VMs. As described briefly below and in numerous earlier patents and patent applications, including patents and applications assigned to VMware, Inc., such a virtualization system may take various forms, including either a hosted system or an unhosted or kernel-based system. Running multiple VMs on a single host can significantly improve the utilization of the underlying hardware resources on the host. Many resource management mechanisms provided by the operating system (OS) in a conventional host machine are also available at the VM level.

In a computer system, the OS typically provides a virtual memory space that is greater than the available physical memory space. In a virtualized environment, an OS executing within a VM may provide a virtual memory space that is greater than the "physical" memory space of the VM. Also, virtualization software may use a technique called memory over-commitment to give the appearance that the total memory included in all the VMs exceeds the actual memory in the host hardware. Thus, more apparent memory can be present at both the guest level and host level. For example, a host machine may have 4 GB of physical memory in its hardware (referred to as "machine memory"). At the guest level, a VM may be configured to have 4 GB of virtualized "physical" memory (referred to as "guest physical memory") and provide 8 GB of virtual memory space (referred to as "guest virtual memory") to the guest processes. Furthermore, the host may accommodate multiple such VMs.

As described in earlier patents and applications, a hosted virtual computer system may comprise virtualization software executing on a host hardware platform, along with a separate host OS, while an unhosted virtual computer system does not include a separate host OS. As is well known, in an unhosted virtual computer system, the virtualization software performs some of the functions performed by the host OS in a hosted virtual computer system. Thus, in an unhosted virtual computer system, the virtualization software may be thought of as including a subset of the OS functionality included in the host OS of a hosted virtual computer system. In this patent, the OS functionality in the virtualization software of an unhosted virtual computer system may be referred to as a host OS, even though the virtual computer system does not include a separate OS, distinct from the virtualization software, at the host level. The virtualization software may comprise or be referred to as a virtual machine monitor (VMM) or a hypervisor. Also in this patent, the term "host" may be used to refer to virtualization software executing on a host physical hardware platform and supporting the execution of one or more VMs. In a hosted virtual computer system, the term "host" also includes a separate host OS. Also in this patent, the term "host MMU" (memory management unit) may be used to refer to software that performs memory management functions at the host level of a virtual computer system, whether the system is a hosted system or an unhosted system.

In general, an OS (either at the host level or guest level) may attempt to map as much virtual memory space as possible to the physical memory space. When another page of physical memory is needed, but there are no physical memory pages available, the OS performs a process called "swapping," during which the OS copies, or "swaps out," one or more pages from physical memory to a secondary storage (e.g., a hard disk) in order to free up physical memory and to meet memory allocation requests by applications. Such swapping can occur at both the host level and guest level.

During swapping at the host level, the host MMU frees up machine memory by copying one or more pages from the machine memory to one or more swap files stored on a hard disk. Similarly, during swapping at the guest level, the guest OS copies one or more pages from the guest physical memory to the guest's persistent storage (e.g., a virtualized hard disk, which can be a file on the host's hard disk). Note that host-level swapping and guest-level swapping may occur separately and are typically independent from each other.

One way to achieve better coordination between host-level swapping and guest-level swapping is to use a process called "ballooning." A "balloon driver" (also called "balloon") is resource reservation code that runs as a driver in the VM and that requests guest memory (which will be allocated by the guest OS but not used meaningfully by any process on the guest). A balloon application could also be used instead of, or in addition to, a balloon driver. In response, the guest OS allocates some guest memory to the balloon driver. Meanwhile, since the balloon driver has now reserved more guest memory, the guest OS's memory management unit may swap out previously allocated guest physical memory pages to the persistent storage in order to satisfy the requests by the balloon driver. The balloon driver identifies the corresponding guest physical memory and notifies the virtualization software on the host about the identified guest physical memory. Subsequently, the host MMU may map one or more pages of the identified guest physical memory to a shared page in the machine memory (since the corresponding guest memory pages are not used meaningfully by any guest process), and frees up machine physical memory pages which can be used by other VMs.

For example, assume that a host has 4 GB of machine memory, and is hosting two VMs (VM 1 and VM 2). Each VM is configured with 4 GB of (virtualized) guest physical memory. Assume further that VM 1 is now using close to 4 GB of the host's machine memory. The host's memory management unit can instruct a balloon driver on VM 1 to request 1 GB of guest memory. As a result, the guest OS on VM 1 allocates 1 GB of guest physical memory to the balloon driver, and in doing so swaps out about 1 GB from its guest physical memory to make this space available. Note that the balloon driver can regularly keep accessing this 1 GB of virtual memory so that it remains mapped into the guest physical memory, but does not use this 1 GB of virtual memory in any meaningful way. Alternatively, the balloon driver may pin the memory pages in guest physical memory. The balloon driver communicates information about this 1 GB of memory to the memory management unit on the host. The host MMU can then map this 1 GB of guest physical memory to one single shared page in the machine memory, which can have a size of 4 KB. Hence, in effect, the 1 GB guest memory allocated to the balloon driver on VM 1 is now mapped to only 4 KB of machine memory. Since the guest OS swapped out 1 GB of guest physical memory to make space for the balloon request and the actual machine memory used by the balloon is about 4 KB, about 1 GB of machine memory is now freed and can be used by VM 2. Hence, the ballooning process effectively forces the guest OS to perform swapping at the guest level to reclaim machine memory. More details about using ballooning to manage VM virtual memory can be found in U.S. Pat. No. 8,359,451, which is incorporated herein by reference in its entirety.

Both host-level swapping and guest-level ballooning allow less frequently accessed memory pages to be temporarily stored on hard disk, so that more machine memory can be available for other applications (e.g., other VMs). However, when an application needs to access a swapped-out page, the OS must swap-in this page from hard disk to the memory. This is a time-consuming process and can incur significant performance overhead. For example, when a user leaves a VM running at the end of the day, the virtualization infrastructure host may swap out the host physical memory previously used by this VM and re-allocate such memory to other VMs. Then, when the user returns the next day, the guest OS might take minutes to swap in the swapped-out content into the memory before the VM is responsive again. Such delay in VM response time negatively impacts the user experience and is undesirable.

SUMMARY

One embodiment of the invention disclosed herein facilitates reduction of latency associated with accessing content of a memory page that has been swapped out by a guest operating system in a virtualized computer system. During operation, virtualization software identifies content previously swapped out by the guest operating system. The virtualization software then prefetches the identified content in the guest operating system's swap file and caches the prefetched content in a prefetch cache in host machine memory. Subsequently, the virtualization software detects an I/O read command which is associated with the cached content and issued by the guest operating system. In response, the virtualization software provides the cached content from the prefetch cache, thereby avoiding accessing the guest swap file.

DETAILED DESCRIPTION

The following description is presented to enable any person skilled in the art to make and use the embodiments of the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Embodiments of the invention disclosed herein may reduce latency incurred in swapping in a previously swapped-out memory page by a guest OS by prefetching such swapped-out page into a prefetch cache in the host's machine memory, in anticipation of a guest application's access to this swapped-out page. The prefetching can occur when one or more VMs on the host no longer need the reclaimed memory (as a result of previous ballooning or host-level swapping), or when the host predicts an increase in memory utilization by the VM which has previously experienced ballooning or swapping-out.

Generally, the memory management unit on the host can prefetch the pages from the hard disk into a prefetch cache in a predetermined order, which can be last-in-first-out or based on certain heuristics. Maintaining knowledge of the order in which pages have been swapped out, however, presents certain challenges when such swapping-out can occur both at the guest level and host level. As discussed above, the host can use at least two techniques for reclaiming machine memory.

First, a hypervisor on the host can cause a balloon driver in a guest to request memory from the guest OS. In response the guest OS attempts to allocate a corresponding amount of guest physical memory to the balloon driver. If the guest OS does not have sufficient free guest physical memory, the guest OS may free up some guest physical memory by i) taking pages from the guest's buffer cache (which is a region in the guest physical memory reserved for caching content stored on the guest hard disk), and ii) swapping pages out of the guest physical memory to a guest swap file stored on the guest hard disk. The guest OS then allocates the freed pages in guest physical memory to the balloon driver. At the host level, the machine memory pages corresponding to the guest physical memory pages allocated to the balloon driver are then reclaimed and may be allocated for other VMs.

Second, if still more machine memory is needed, the hypervisor can also perform host-level swapping, which involves swapping out machine memory pages to provide sufficient space for new memory requirements. Note that the host typically prioritizes ballooning over host-level swapping because ballooning generally enables the guest OS to make more intelligent decisions regarding which pages to swap.

With either of the two reclamation techniques, a guest process can experience significant latency when accessing a swapped out page. To reduce the latency, the host MMU prefetches swapped out pages from disk and stores them in a prefetch cache in machine memory. When the guest process attempts to access a previously swapped-out page, the I/O request will eventually pass through the prefetch cache, and the page can be read from the prefetch cache, instead of the host hard disk. The prefetching can be scheduled in various ways. For example, when the host consolidates (e.g., reclaims) a VM's consumed memory during an idle period by ballooning or host-level swapping, the host can record the VM's stable memory consumption level, along with the amount of swapped and/or ballooned memory at that stable level. The host can then restore the VM's consumed memory to the recorded level by prefetching the swapped-out pages at a later time.

For the prefetching to be more effective, however, it is generally advantageous for the host to maintain knowledge of which pages have been swapped out and the order in which they have been swapped out, which may not be an easy task depending on how the swapping occurred (e.g., host-level swapping vs. guest-level swapping caused by ballooning).

With host-level swapping, since the information about swapped-out pages is readily available within the virtualization software, the hypervisor can use this information to prefetch the most recently swapped pages in the reverse order into the prefetch cache in the machine memory until the amount of swapped machine memory matches its previous stable levels. The guest can then access the page in the prefetch cache or other machine memory location, which also avoids the latency associated with reading the page from disk.

Prefetching pages that have been swapped out by the guest OS in response to ballooning can be more complex because the swapping occurs at the guest level and the order in which pages are swapped out is not readily visible to the hypervisor. There can be two scenarios associated with guest-level swapping as the result of ballooning: the guest OS swapping out a page that is allocated to a guest process, and the guest OS taking away a page from the buffer cache in the guest physical memory (which means a process accessing that page will have to retrieve it from the guest hard disk). To facilitate prefetching the pages used by a guest process that the guest has internally swapped out to the guest swap file in response to an expanding balloon, the hypervisor monitors and detects a guest write I/O to a swap file. The hypervisor further records the location of the page in the swap file (e.g., offset within the guest swap file). When there is sufficient host machine memory available, the host prefetches one or more pages and writes the prefetched pages to the prefetch cache (e.g., copies the pages from disk to the prefetch cache in host memory). The guest then accesses the prefetched page from the prefetch cache instead of the disk, thereby avoiding the latency associated with reading the page from disk.

To facilitate prefetching guest buffer cache pages that have been dropped by the guest OS in response to ballooning, the hypervisor monitors full page reads by the guest, records the disk offset of each full page, and installs a write trace on the full page. If the host detects that the guest writes on a traced page while pages are allocated to the balloon driver (e.g., expanding balloon), then the host records the page on a buffer cache page list. When the host determines that available host machine memory is above a predetermined threshold, the host prefetches pages from disk and writes the pages into the host prefetch cache. The pages are available in machine memory for the guest, and the guest does not need to retrieve the pages from disk, thereby avoiding the latency associated with reading the page from disk.

Note that if the guest is paravritualized, the guest can communicate directly with the hypervisor about the swapped-out pages. For example, in Linux, this communication is possible by adding features to the existing VMware tools daemons. Such cooperation from the guest can eliminate the need to monitor guest write I/O or to have an in-guest tool to locate the guest swap file.

Figure 1:
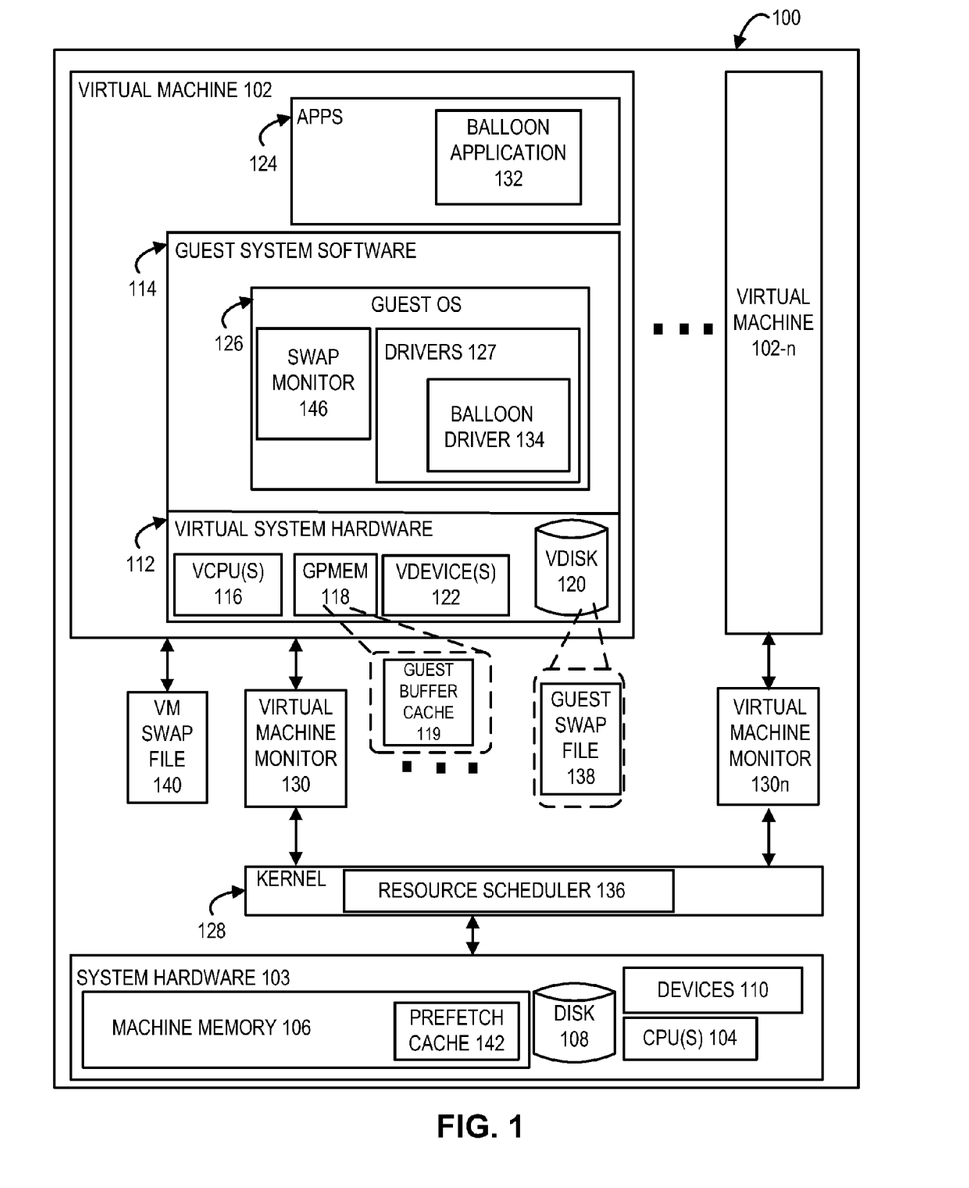
FIG. 1 illustrates an exemplary arrangement of a computer system that implements virtualization.

FIG. 1 illustrates an exemplary arrangement of a computer system 100 that implements virtualization, according to an embodiment. A virtual machine (VM) 102 (guest) is installed on host computer system 100, which includes system hardware 103 and one or more layers or co-resident components including a kernel (such as an OS kernel) 128 and one or more virtual machine monitors or hypervisors 130, 130n.

System hardware 103 can include one or more CPUs 104, some form of machine memory 106 (volatile or non-volatile), one or more storage devices such as one or more disks 108, and one or more devices 110, which may be integral or separate and removable.

A VM 102 residing in host 100 mimics the general structure of a physical computer and has both virtual system hardware 112 and guest system software 114. Virtual system hardware 112 typically includes one or more virtual CPU(s) 116, guest physical memory 118, at least one virtual disk 120, and one or more virtual devices 122. All of the virtual hardware components of VM 102 may be implemented in software to emulate corresponding physical components. Guest system software 114 includes a guest OS 126 and drivers 127 as needed, for example, for the various virtual devices 122.

Applications 124 running on VM 102 ideally function as they would if run on a "real" computer. Guest OS 126 accesses executable files from virtual disk 120 or guest physical memory 118, which are portions of actual physical disk 108 or machine memory 106 allocated to VM 102.

In general, a virtualization layer resides between the guest software within a VM and the various hardware components. This virtualization layer is often referred to as "virtual machine monitors," "hypervisors," or virtualization "kernels." These terms do not always provide clear distinctions between the software layers and components to which they refer. For example, "hypervisor" is often used to describe both a virtual machine monitor and a kernel together, either as separate but cooperating components or with one or more virtual machine monitors incorporated wholly or partially into the kernel itself; however, "hypervisor" is sometimes used instead to mean some variant of a virtual machine monitor alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in a host OS itself.

Various virtualized hardware components in the VM 102, such as virtual CPU(s) 116, guest physical memory 118, virtual disk 120, and virtual device(s) 122, are shown as being part of VM 102 for conceptual simplicity. In actuality, these "components" are often implemented as software emulations included in some part of the virtualization software, such as virtual machine monitor 130. One advantage of such an arrangement is that the virtualization software may (but need not) be set up to expose "generic" devices, which facilitate, for example, migration of VMs from one hardware platform to another.

As described briefly above, the intermediate system-level software layer(s)—can be arranged in a "hosted" configuration or a non-hosted or unhosted configuration. In a hosted virtualized computer system, an existing, general-purpose operating system forms a "host" OS that is used to perform certain input/output (I/O) operations, alongside and sometimes at the request and direction of virtual machine monitor 130. The host OS, which usually includes drivers and supports applications of its own, and the virtual machine monitor are both able to directly access at least some of the same hardware resources, with conflicts being avoided by a context-switching mechanism. The Workstation product of VMware, Inc., of Palo Alto, Calif., is an example of a hosted, virtualized computer system.

In many cases, it may be beneficial to deploy virtual machine monitors on top of a software layer, such as kernel 128, constructed specifically to provide efficient support for the VMs. This configuration is frequently referred to as being "non-hosted." Compared with a hosted system, use of a specialized kernel offers greater modularity and facilitates provision of services (for example, resource management) that extend across multiple virtual machines. Such a specialized kernel may offer greater performance because it can be co-developed with the virtual machine monitor and be optimized for the characteristics of a workload comprised primarily of VMs and virtual machine monitors.

Embodiments of the system disclosed herein may be implemented in both a hosted and a non-hosted virtualized computer system, in which the included virtual machine(s) may be fully or para-virtualized. Moreover, these embodiments may be implemented wholly or partially in hardware, for example in processor architectures intended to provide hardware support for virtual machines.

To facilitate effective memory management, many operating systems introduce a layer of abstraction between the memory addresses used by the applications and the memory addresses describing machine memory. When an application requests memory, the operating system allocates memory in a first address space, typically called a virtual memory address space. This first memory address space maps to a second memory address space corresponding to the machine memory of the computer. A page table indicates the relationships between the two address spaces and maps virtual memory addresses (for example, given as page numbers) to machine memory addresses. It is common for multiple virtual memory address spaces, as well as multiple page tables, to be implemented in modern operating systems. For example, each application may have its own virtual memory address space. In many systems, each application can treat its virtual memory address space as if it had exclusive use of that memory. The operating system organizes these virtual memory address spaces and keeps track of the corresponding machine memory addresses using entries in a page table.

One of the advantages of using virtual memory address spaces is that the amount of virtual memory used by the applications may exceed the amount of machine memory available on the computer. When such a situation occurs, the operating system uses a secondary storage medium, such as a hard disk, to store some of the data contained in virtual memory. When data from some virtual memory pages is actually stored on the secondary storage medium, the page table maps some virtual memory addresses to machine memory addresses, while other virtual memory addresses are mapped to locations on the secondary storage medium.

If an application attempts to access a virtual memory address not mapped to machine memory, a "page fault" occurs. In response to a page fault, the operating system retrieves the requested data from the appropriate storage device, stores it in machine memory, and updates the page table with the address of the location in machine memory. Retrieving a page and storing it in machine memory is commonly described as "paging-in" (or "swapping in") the requested page. In order to make room in the machine memory (either to accommodate memory requests from applications or to page-in some data) the operating system can "page-out" (or "swap out") a page presently stored in the machine memory, that is, copying a page from the machine memory to a secondary storage device and updating the page table accordingly. Subsequent access to that virtual memory address can then result in a page fault and the paging-in process would occur. Ideally, the operating system is configured to page-out pages that are inactive so that they will not have to be paged back in for some reasonable amount of time. Various methods for determining which pages are inactive and are good candidates to be paged-out are well known in the art.

When guest operating system 126 executes on virtual machine 102, guest OS 126 treats the guest physical memory 118 as if it were the machine memory of a computer system. Correspondingly guest OS 126 creates virtual memory address spaces (not shown) and maps them into guest physical memory 118.

The virtualization layer introduces an additional layer of memory management abstraction. Kernel 128 typically emulates guest physical memory 118 by mapping guest physical memory 118 to machine memory 106. In many ways, mapping of guest physical memory 118 to machine memory 106 is analogous to the mapping of virtual memory addresses to machine memory addresses performed by an operating system. Guest OS 126 running on VM 102 treats guest physical memory 118 as if it had exclusive control over that memory. Furthermore, as in virtual memory managed by an operating system, the total amount of guest physical memory used by various virtual machines may exceed the total amount of machine memory 106. Virtual machine monitor 130 organizes these virtual memory addresses and keeps track of the corresponding machine memory addresses in the machine memory 106.

Thus, when a guest OS 126 implements virtual memory, typically three levels of memory address spaces are present. Guest OS 126 creates some virtual memory address spaces at the guest level. In this disclosure, as mentioned earlier, these address spaces are referred to as "guest virtual memory," which are addressed using a "guest virtual page number" (GVPN). Guest OS 126 maintains a page table that maps this guest virtual memory to guest physical memory 118. Typically, guest OS 126 treats guest physical memory 118 as if it were machine memory. The address space of guest physical memory 118 is referred to as the "guest physical memory," which is addressed using a "guest physical page number" (GPPN). Virtual machine monitor 130 maintains a data structure (such as a page table in the case of "nested page tables" or "extended page tables") that maps this guest physical memory to machine memory 106. For processors that do not support "nested page tables" or "extended page tables", the virtual machine monitor 130 may also maintain shadow page tables that map guest virtual memory to machine memory 106. Machine memory 106 is addressed using a "machine page number" (MPN). These three levels of memory address spaces are further discussed with reference to FIG. 2.

One approach for allowing the total amount of guest physical memory used by the various virtual machines to exceed the total amount of machine memory is for kernel 128 to page-out some of the inactive guest physical memory (e.g., host-level swapping). For example, kernel 128 can copy pages from machine memory 106 to disk 108 and adjust the page table entry for the corresponding guest physical memory accordingly. Another approach to managing over-commitment of machine memory is to use a balloon application 132 or a balloon driver 134.

Balloon application 132 may execute as a guest application 124 on VM 102. In one embodiment, balloon application 132 executes as a user-level application. If balloon application 132 is not privileged, it typically may not be able to reserve arbitrary amounts of guest physical memory. According to another embodiment of the present invention, the balloon application 132 executes with special permissions, for example, by running in kernel mode, that allow it to perform certain actions not ordinarily permitted by user-level applications.

Guest OS 126 may include a balloon driver 134, either instead of or in addition to the balloon application 132. The balloon driver 134 executes as a device driver and is capable of performing certain privileged actions. For example, balloon driver 134 may be able to reserve guest physical memory, perform I/O commands, write to protected areas of guest physical memory, and to modify page tables. Balloon driver 134 may also perform other actions typically performed by operating system device drivers.

In this disclosure, the term "balloon" may refer to balloon driver 134 and/or balloon application 132. A balloon "expands" or "contracts" in the guest when balloon driver 134 receives allocation parameters from virtual machine monitor 130 or a resource scheduler 136 in host kernel 128. In response, balloon driver 134 or balloon application 132 requests a memory allocation from guest OS 126, and guest OS 126 allocates memory accordingly. Resource scheduler 136 is responsible for assigning resources, such as machine memory, to various virtual machines. In one embodiment, resource scheduler 136 monitors VM 102's usage of guest physical memory to determine how much machine memory to allocate to VM 102.

If resource scheduler 136 determines that the amount of machine memory allocated to a virtual machine should be adjusted, resource scheduler 136 may reclaim the machine memory. For example, resource scheduler 136 may page-out some of the guest physical memory to a secondary storage device, effectively reducing the amount of machine memory allocated to that virtual machine. Resource scheduler 136 may reclaim some of the machine memory by using balloon driver 134 to reduce the amount of guest physical memory used by applications in VM 102.

Also included in the example in FIG. 1 are multiple caches and swap files at both the guest level and host level. At the guest level, guest OS 126 has its own internal guest swap file 138, which can be a standard operating system swap file stored on virtual disk 120. A swap monitor 146 maintains knowledge about the swapped-out pages and their locations within guest swap file 138. Guest OS 126 may also include a guest buffer cache 119 in guest physical memory 118 to cache data recently read from or written to virtual disk 120.

At the host level, each VM can be associated with a VM swap file stored in hard disk 108 (such as VM swap file 140), which the host uses to store guest pages when performing host-level swapping. A prefetch cache 142 is an area in machine memory 106 that stores pages prefetched from VM swap files. The host may have one or more such prefetch caches to store prefetched pages.

As mentioned earlier, memory addresses in the guest virtual memory address spaces are indexed by GVPNs, and memory addresses in the guest physical memory address space are indexed by GPPNs. Guest OS 126 maintains a page table mapping GVPNs to GPPNs. If a guest virtual memory page has been paged-out, the page table may not indicate any corresponding guest physical memory page, resulting in a page fault. Instead, an entry in the page table may point to a location on virtual disk 120 where the swapped-out page is located.

Similarly, memory addresses in the machine memory address space are indexed by MPNs. Virtual machine monitor 130 maintains a data structure (such as a page table) mapping the GPPNs to MPNs. If a guest physical memory page has been paged-out, instead of mapping to a MPN, its page table entry may map to a location on disk 108 (or may include some other indication that the page is stored on disk).

Figure 2:
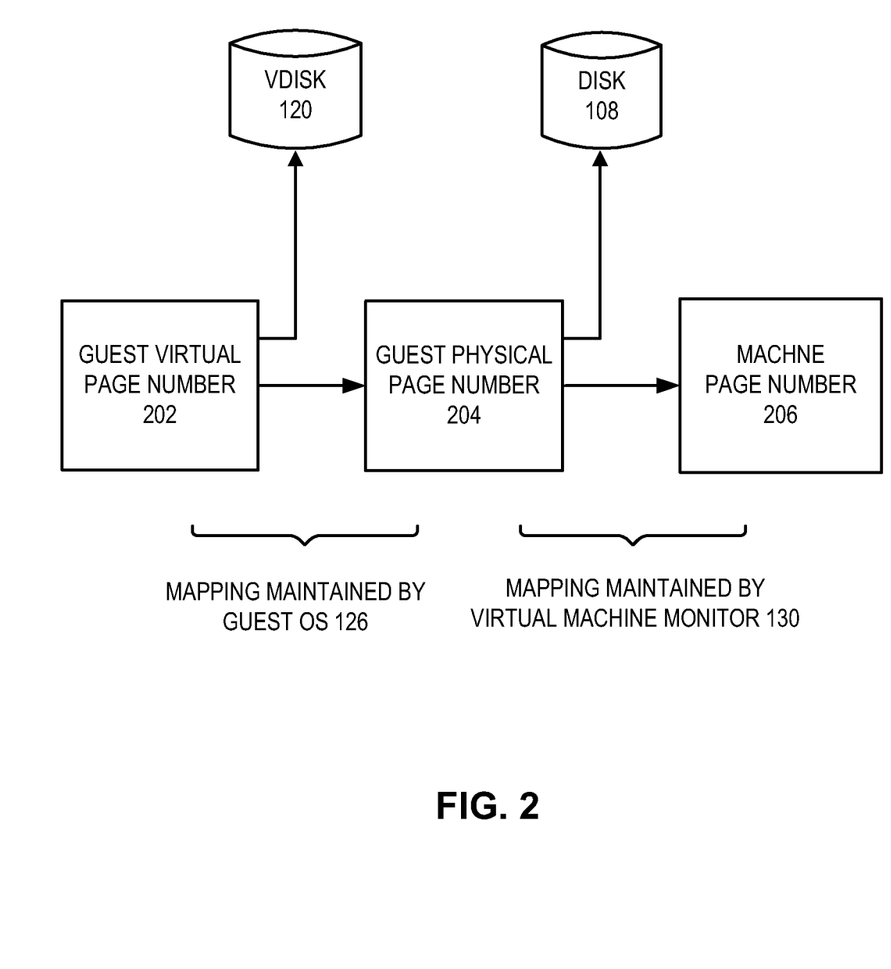
FIG. 2 illustrates a three-level memory address space configuration in a virtualization environment.

FIG. 2 illustrates a three-level memory address space configuration in a virtualization environment. In this example, a GVPN 202 is mapped to a GPPN 204. The mapping of the GVPN 202 is maintained by guest OS 126. The GPPN 204 is then mapped to a MPN 206. The mapping of the GPPN 204 is maintained by virtual machine monitor 130.

Disk 108 provides the secondary storage for storing swapped-out pages as a result of host-level swapping. Similarly, virtual disk 120 provides the secondary storage for storing swapped-out pages as a result of guest-level swapping (which can be caused by ballooning).

Note that at each level of memory management abstraction, memory addresses may be treated as if they were tangible memory locations. For example, suppose a guest application writes data to a guest virtual memory location within a memory page described by the GVPN 202. To the guest application, this memory location is the destination in which the data will be written. However, at another layer of abstraction, the guest virtual memory location described by the GVPN 202 maps to a guest physical memory location described by the GPPN 204. To the guest operating system 126, this memory location is the destination in which the data will be written. But again, at yet another layer of abstraction, the guest physical memory location described by the GPPN 204 maps to a machine memory location described by the MPN 206. The same write operation may have the appearance of writing to three memory locations—a guest virtual location, a guest physical location, and a machine memory location. However, in the example illustrated, the guest virtual location maps to the guest physical location, which maps to the machine memory location, so attempting to write to any of the three locations in fact results in the writing of data to the same machine memory location. A subsequent read from either the guest virtual location, the guest physical location, or the machine memory location (provided the various mappings are still in place) will return the data read from the machine memory location.

Figure 3A:
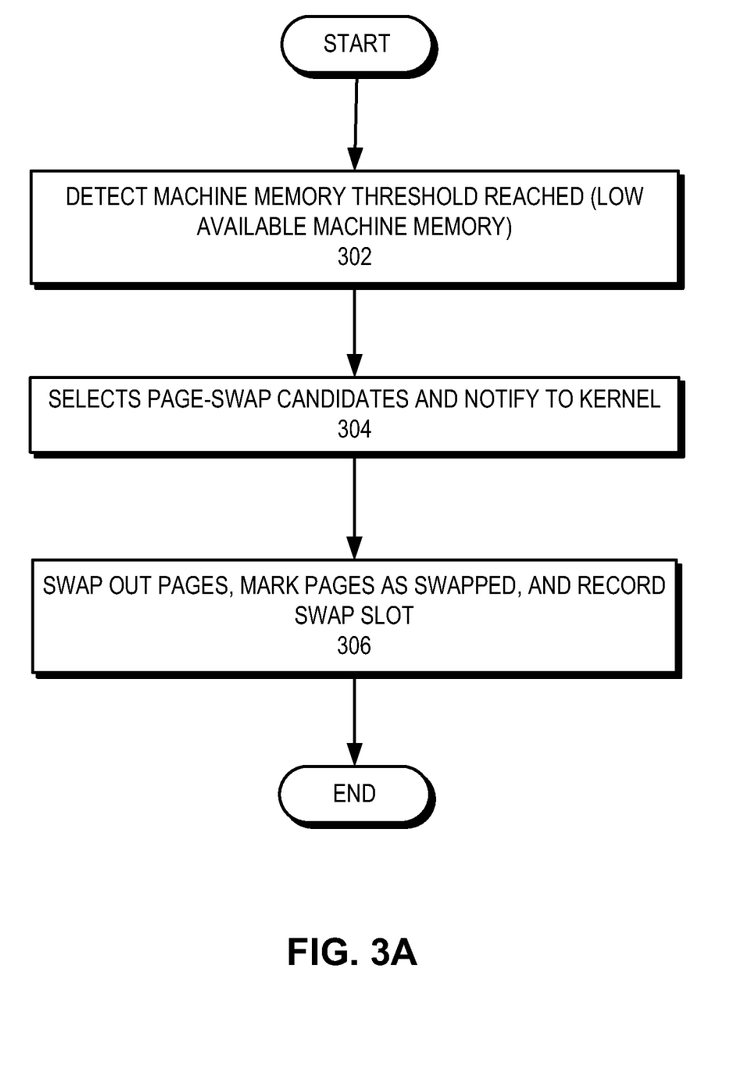
FIG. 3A presents a flowchart illustrating an exemplary process for host-level swapping.

FIG. 3A presents a flowchart illustrating an exemplary process for host-level swapping, according to an embodiment. During operation, the host kernel detects that a low available machine memory threshold has been reached (operation 302). As discussed previously, the hypervisor may first attempt to use ballooning (which can cause guest-level swapping) to reclaim memory, but if ballooning is insufficient, then the hypervisor uses host-level swapping. Next, the hypervisor selects page-swap candidates and notifies the host kernel of such candidates (operation 304). Subsequently, the kernel swaps out the pages, marks the pages as swapped, and records information indicating the location of slots in swap file 140 corresponding to the swapped-out pages (operation 306).

In one embodiment, for each VM, the hypervisor maintains a page frame number (PFN) database which contains metadata to describe the VM's guest physical memory. An entry in a respective PFN database describes a guest physical memory page (corresponding to a GPPN). In some implementations an entry in the PFN is referred to as a "pframe" data structure. When the host kernel swaps a page out, the hypervisor may set a bit in the corresponding pframe to record that the page is no longer mapped to machine memory and indicate the location within the corresponding swap file for that page in the pframe.

Figure 3B:
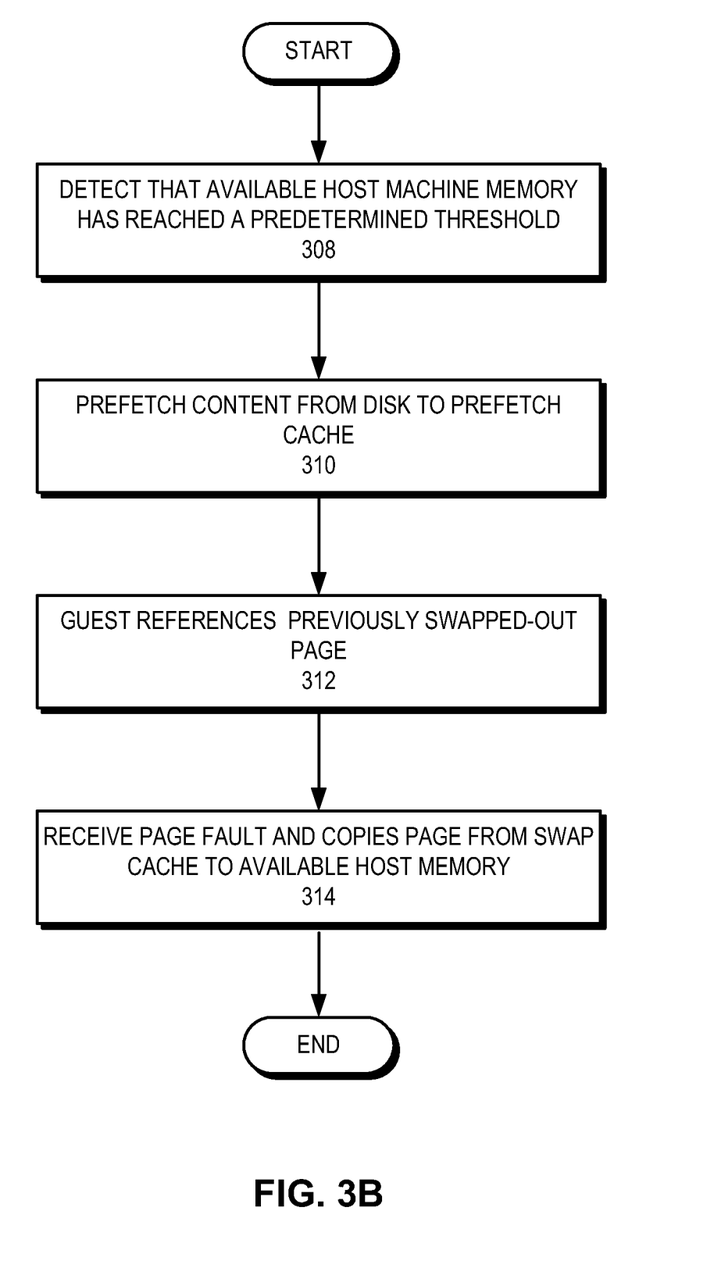
FIG. 3B presents a flowchart illustrating an exemplary process for prefetching a page that has been previously swapped out at the host level.

FIG. 3B presents a flowchart illustrating an exemplary process for prefetching a page that has been previously swapped out at the host level. During operation, the hypervisor initially detects that host machine memory availability has reached a predetermined threshold (operation 308). In other words, there is sufficient machine memory available such that the host may start swapping in pages from VM swap file 140. Note that each swap slot is associated with an offset within the VM swap file 140. The hypervisor then traverses the swap slots in VM swap file 140 and prefetches the pages to prefetch cache 142 (operation 310). For example, the hypervisor may prefetch page contents from the swap slots to the prefetch cache 142 by processing each of the swap slots in reverse order, assuming that the swapped-out pages are stored in VM swap file 140 linearly without fragmentation. In some embodiments, the hypervisor may also record the order of page swaps and prefetches the most recently swapped pages first (i.e., in a last-in-first-out order) until the utilization of the host machine memory has reached a predetermined level. In one embodiment, a dedicated hypervisor memory pool may operate as a prefetch cache to store swapped-in pages from host-level swapping. A prefaulter can execute in the host background, read pages from disk 108, and copy pages to the prefetch cache.

Subsequently, the guest may reference a page that has been previously swapped out to disk (operation 312), and the host kernel throws a page fault. When the kernel attempts to retrieve the page from the hard disk, the I/O read request can be satisfied by the page stored in prefetch cache 142. As a result, the kernel copies the page from prefetch cache 142 to available host memory without having to access the hard disk (operation 314).

In some embodiments, after prefetching a page, the kernel may proactively communicate with the hypervisor to establish a machine memory mapping, so that there is no page fault when the guest references the page. For example, the kernel may provide the location of the swapped-in page in prefetch cache 142 to the hypervisor. The hypervisor can then establish a mapping between GPPN and MPN for that page. This way, the guest may directly access the page by referencing the GPPN.

Figure 4:
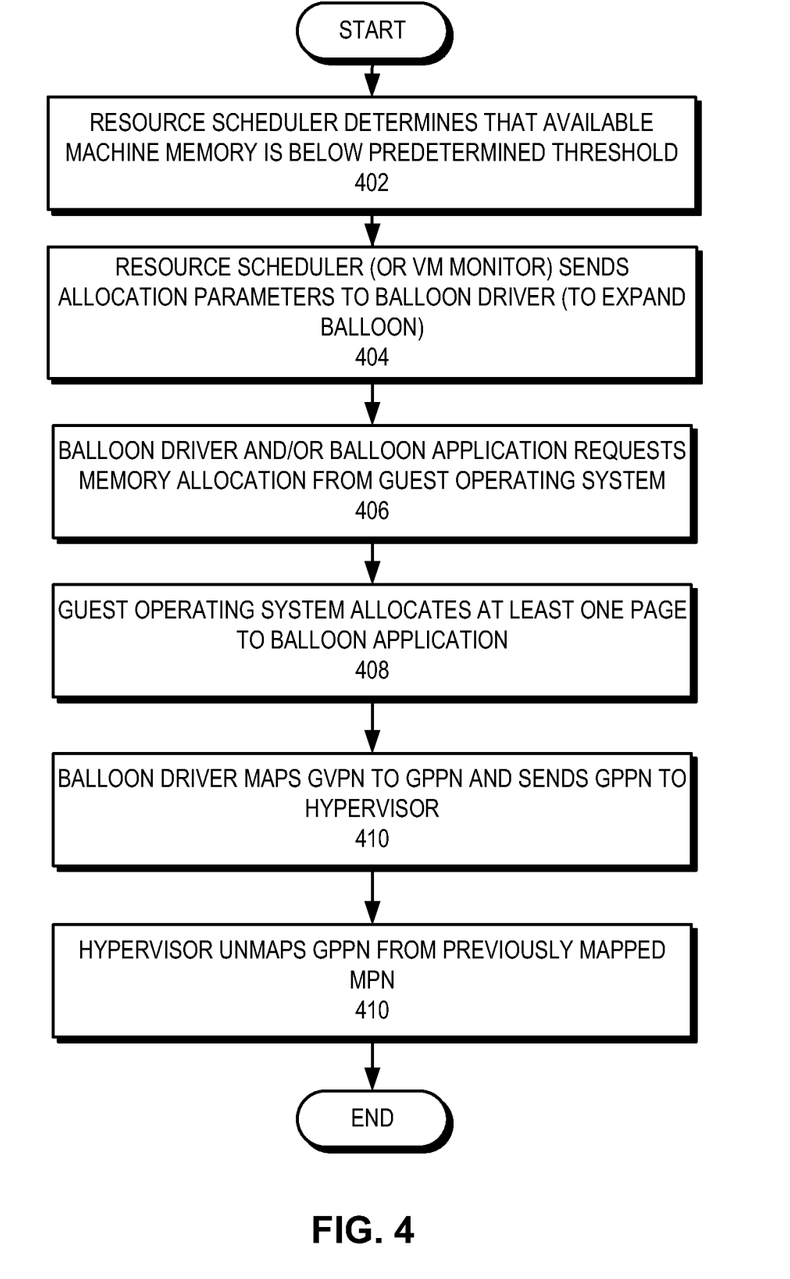
FIG. 4 presents a flowchart illustrating an exemplary ballooning process.

FIG. 4 presents a flowchart illustrating an exemplary ballooning process. During operation, a resource scheduler in the host determines that available host machine memory is below a predetermined threshold (operation 402). In response, the resource scheduler (or virtual machine monitor) sends memory allocation parameters to balloon driver 134 to cause the guest OS to allocate pages to balloon application 132 (or balloon driver 134) (operation 404).

Subsequently, balloon driver 134 and/or balloon application 132 requests memory allocation from the guest OS (operation 406). The guest OS then allocates at least one guest physical memory page to balloon application 132 (or balloon driver 134) (operation 408). Note that the allocated page in the guest physical memory can be a free page, a page that is in use by another process, or a page that is previously used by the guest buffer cache. When the guest allocates a free page to balloon application 132, there is no guest-level swapping necessary, and hence no subsequent swap-in and associated disk-access latency. On the other hand, when the guest allocates a page that is previously in use by another process (which results in swapping out for that page), or a page previously used by the buffer cache, there can be a latency penalty at a later time when such page is accessed, because its content would have to be retrieved from the guest's disk. In some implementations, balloon driver 134 may hard pin the allocated pages, thereby preventing the guest operating system from reallocating (e.g., swapping out) these pages. Next, balloon application 132 sends the allocated GVPN to balloon driver 134. In turn, balloon driver 134 maps the GVPN to GPPN sends the GPPN to the hypervisor (operation 410). The hypervisor then unmaps the GPPN from the previously mapped MPN in the virtual machine monitor's page table (operation 412). As a result, the machine memory page corresponding to the MPN is now free.

When balloon application 132 requests allocation of guest physical memory pages, the guest OS may take guest physical pages from the buffer cache and allocate the guest physical pages to balloon application 132. If the guest OS cannot take guest physical pages from the buffer cache, the guest OS may take guest physical pages in use by other processes and allocate those pages to balloon application 132.

When the guest allocates a buffer cache page to balloon application 132, the guest evicts a page from the buffer cache. Since the page is no longer in the buffer cache, when a guest process subsequently attempts to access the page, the guest OS will have to retrieve the page from disk 108. Note that a buffer cache typically contains memory pages that are not actively being used by a process, and the operating system stores recently accessed data in the buffer cache.

When the guest allocates a page previously in use by another process to balloon application 132, the guest OS swaps out this page. Subsequently, when that process accesses this swapped out page at a later time, the page must be read from disk 108, thereby incurring latency during execution of that process.

Since ballooning results in swapping at the guest level, information regarding swapped-out pages (such as their GPPNs and the order in which they are swapped) may not be readily available to the hypervisor. In order to obtain this information, the hypervisor monitors the I/O operations from the guest to identify and locate these swapped-out pages in the guest swap file. The hypervisor can then prefetch them into the host machine memory. Take the system illustrated in FIG. 1 for example, within guest OS 126, swap monitor 146 monitors guest swap file 138 and can determine its location within the virtual machine's image file. Swap monitor 146 can obtain information regarding guest swap file 138 at VM 102's boot-up time, and monitor guest swap file 138 for any changes. Swap monitor 146 then passes on information regarding the location of guest swap file 138 to the hypervisor. As a result, the hypervisor can determine all offsets of the swap file within the virtual disk, including the beginning address and length of a contiguous swap file or ranges of a fragmented swap file.

Figure 5:
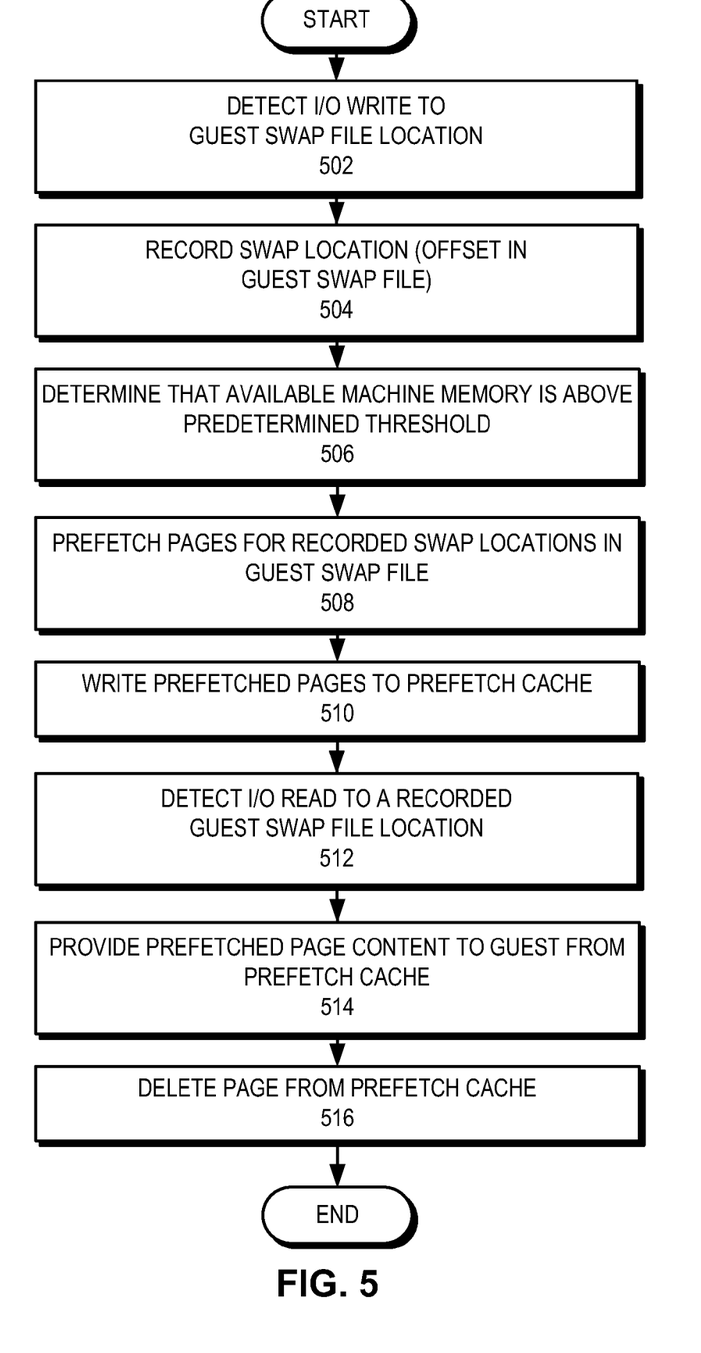
FIG. 5 presents a flowchart illustrating an exemplary process for prefetching pages that have been previously in use by another guest process and are swapped out at the guest level.

FIG. 5 presents a flowchart illustrating an exemplary process for prefetching pages that have been previously in use by another guest process and are swapped out at the guest level.

During operation, when guest OS 126 writes a swapped-out page to guest swap file 138, the hypervisor detects a write I/O to the guest swap file location (operation 502). Note that the hypervisor monitors all guest I/O commands from the virtual machine. A guest I/O write command to the guest swap file location indicates that guest OS 126 is swapping out guest physical memory, possibly in response to ballooning. Note that in some cases the guest operating system may also swap a page used by a process without balloon application 132 requesting memory allocation. Next, the hypervisor records the location within guest swap file 138 where the swapped-out page is stored (e.g., offset within guest swap file 138) in a swap locations list (operation 504). In one embodiment, the swap locations list can also record the order in which the pages are swapped out. Note that the pages referred to by entries in the swap locations list are written but unread by the guest. In other words, the guest has swapped out the physical memory pages to disk but has not yet read back the pages referred to by entries in the swap locations list. If the hypervisor detects an I/O read command to a particular swap file location, that means the stored page is being retrieved by the guest OS, and the corresponding entry in the swap location list is removed.

When the hypervisor detects that available machine memory is above a predetermined threshold (operation 506), the hypervisor prefetches one or more pages from the guest swap file based on the recorded list of swap locations (operation 508). The hypervisor then writes the prefetched pages into prefetch cache 142 (operation 510). The hypervisor may prefetch the pages according to an order that is the reverse of the order in which the pages are stored in the guest swap locations list. The hypervisor may also randomly select pages for prefetching or use any other selection technique.

Subsequently, when the hypervisor detects a guest I/O read command at one of the swap file offset entries in the swap locations list (operation 512), the hypervisor provides the prefetched page content to the guest from the prefetch cache 142 (operation 514). The host can determine which page the guest is attempting to read by examining the swap file offset of the I/O read command. By making the page content available from prefetch cache 142 in machine memory, the host eliminates the latency that would be associated with a disk read operation. After fulfilling the guest I/O read operation, since the page is now loaded back into the guest physical memory, the host may delete the page from prefetch cache 142 (operation 516). Guest OS 126 may also delete the page from guest swap file 138. In some embodiments, in response to host-level memory pressure the host may delete the contents of prefetch cache 142 and reallocate the machine memory space of the prefetch cache (e.g., reallocate to other virtual machines).

During the process of ballooning, guest OS 126 might allocate one or more pages previously used by guest buffer cache 119 to balloon application 132. Consequently, a subsequent access by a guest process to these pages would require access to virtual disk 120 (since the desired content is no longer present in guest buffer cache 119), which can result in significant delay. Prefetching pages dropped from guest buffer cache 119 can mitigate such delays.

Figure 6:
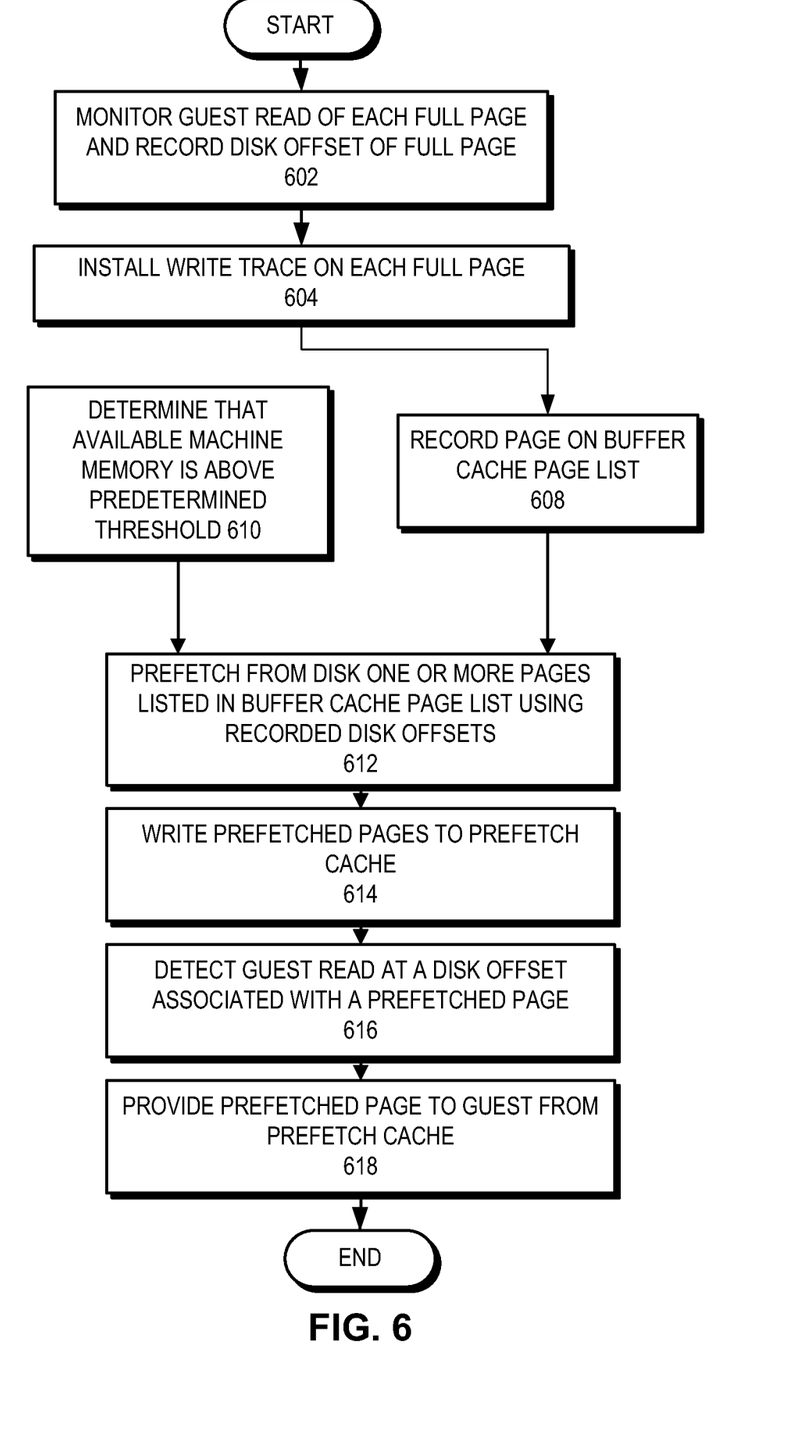
FIG. 6 presents a flowchart illustrating an exemplary process for reducing latency due to eviction of buffer cache pages.

FIG. 6 presents a flowchart illustrating an exemplary process for prefetching pages that have been previously part of a guest buffer cache and are swapped out at the guest level. During operation, the hypervisor monitors guest I/O read commands for full pages (e.g., 4 KB), and records disk offsets of guest I/O reads to any location on the guest's disk image file (e.g., virtual disk 120) (operation 602). The reason for the hypervisor to monitor full-page-size I/O reads is that when a page is loaded from virtual disk 120 into buffer cache 119, the I/O read command is typically for an entire page. It is also possible to implement buffer cache 119 in such a way that it does not require full-page reads. Full-page reads, however, are more likely to be the common case and can be readily detected. The hypervisor then enables write tracing on the full pages that are read into guest memory (operation 604). Methods for page tracing are well known to a person of skill in the art. If guest OS 126 attempts to write to a traced page, the hypervisor receives an event notification.

If guest OS 126 writes to a traced page, the hypervisor records the page information (such as the page's corresponding location on the virtual disk) in a buffer cache page list, since probably the cause of the writing is page reclamation associated with the expanding balloon (operation 608). The guest may evict a buffer cache page in order to allocate the page to balloon application 132 and balloon application 132 in turn overwrites the contents of the former buffer cache page (e.g., writing zeros to the page). Note that the writing operation on a page in the buffer cache indicates that the page is no longer a buffer cache page. Subsequently, when the hypervisor determines that available machine memory is above a predetermined threshold (operation 610), the host prefetches from disk one or more pages that are listed on the buffer cache page list (operation 612). In some embodiments, the host may maintain a record of the order in which the guest evicts pages during balloon expansion and prefetch pages in the reverse order after the balloon contracts. The hypervisor may use the recorded disk offset information associated with each listed page to locate and prefetch the page from disk (operation 612). The hypervisor then writes the prefetched pages to host prefetch cache 142 (operation 614).

As the hypervisor monitors the guest read I/O, if the host detects the guest is attempting to read a prefetched page at a disk offset (e.g., within virtual disk 120) associated with a prefetched page (operation 616), the host retrieves the prefetched page from host prefetch cache 142 and provides the prefetched page to the guest as the outcome of the read I/O (operation 618). By providing the prefetched page to the guest directly from machine memory, the host reduces the latency that would otherwise be required if the guest must retrieve the evicted buffer cache page from disk.

Note that it is also possible that the balloon process might not immediately trigger a write to the guest buffer cache page, depending on the guest OS's page zeroing policy. For example, some kernels allow allocation of a non-zeroed page as part of the performance optimization. The host would still zero-share the page anyway, since the page is reclaimed thereafter and its content in the guest would be meaningless. Nevertheless, the hypervisor can be certain that writes to a guest buffer cache page indicate that it is no longer a buffer cache page, although the hypervisor cannot always determine when such writes will occur. Hence, in general, the hypervisor can track not only guest buffer cache eviction during ballooning, but also the set of pages believed to be buffer cache pages prior to the start of ballooning, and attempt to restore such state via prefetch later. In a further embodiment, a paravirtualized guest can communicate to the hypervisor about the pages dropped from the guest buffer cache, which obviates the need for the hypervisor to monitor the guest I/O in order to identify such pages.

In summary, embodiments of the present invention provide a system and a method for reducing latency incurred in accessing swapped out memory pages in a virtualized computer system. A hypervisor can prefetch memory pages that have been swapped out at the host level. For memory pages swapped out at the guest level, the hypervisor monitors the guest I/O to identify and locate the swapped out pages, and prefetches such pages in a manner that is transparent to the guest.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for reducing latency associated with accessing content of a memory page that has been previously swapped out by a guest operating system in a virtualized computer system, comprising:
   identifying content of the memory page that has been previously swapped out by the guest operating system to a swap file;
   prefetching the identified content in the guest operating system's swap file;
   caching the prefetched content in a prefetch cache in host machine memory;
   detecting an I/O read command which is associated with the cached content and issued by the guest operating system; and
   providing the cached content from the prefetch cache, thereby avoiding accessing the guest operating system's swap file.

2. The method of claim 1, wherein identifying the content of the memory page that has been previously swapped out by the guest operating system comprises receiving information regarding the swapped out content from within the virtual machine.

3. The method of claim 1, wherein identifying the content of the memory page that has been previously swapped out by the guest operating system comprises detecting an I/O write command issued by the guest operating system at a swap location within the guest operating system's swap file.

4. The method of claim 1, further comprising deleting the content from the prefetch cache subsequent to providing the content to the guest operating system.

5. The method of claim 1, further comprising receiving address information associated with the guest operating system's swap file at the virtual machine's boot-up.

6. The method of claim 1, further comprising prefetching contents of a plurality of pages in an order that is reverse to an order in which these pages are swapped out by the guest operating system.

7. A method for reducing latency associated with accessing content of a memory page that has been evicted out of a buffer cache of a guest operating system of a virtual machine in response to a ballooning process, comprising:
   detecting an I/O read command from the guest operating system for a full-sized page stored on a virtual disk of the virtual machine, the page having the content of the memory page;
   recording a location of the full-sized page as stored on the virtual disk;
   determining that the guest operating system is writing to the memory page and recording data regarding the memory page;
   prefetching contents of the memory page from the recorded location on the virtual disk;
   detecting that a guest operating system attempts to read at the recorded location; and
   providing the prefetched content of the full-sized page to the guest operating system.

8. The method of claim 7, wherein determining that the guest operating system is writing to the memory page further comprises:
   setting a write trace on the memory page, the memory page being a page in the virtual machine's physical memory, and
   receiving an event signal when the guest operating system writes to the memory page.

9. The method of claim 7, wherein prefetching contents of the memory page comprises storing contents of the full-sized page in a host prefetch cache.

10. A non-transitory computer readable storage medium storing instructions which when executed by a processor cause the processor to perform a method for reducing latency associated with accessing content of a memory page that has been previously swapped out by a guest operating system in a virtualized computer system, the method comprising:
    identifying content of the memory page that has been previously swapped out by the guest operating system to a swap file;
    prefetching the identified content from the guest operating system's swap file;
    caching the prefetched content in a prefetch cache in host machine memory;
    detecting an I/O read command which is associated with the cached content and issued by the guest operating system; and
    providing the cached content from the prefetch cache, thereby avoiding accessing the guest operating system's swap file.

11. The non-transitory computer readable storage medium of claim 10, wherein identifying the content of the memory page that has been previously swapped out by the guest operating system comprises receiving information regarding the swapped out content from within the virtual machine.

12. The non-transitory computer readable storage medium of claim 10, wherein identifying the content of the memory page that has been previously swapped out by the guest operating system comprises detecting an I/O write command issued by the guest operating system at a swap location with the guest operating system's swap file.

13. The non-transitory computer readable storage medium of claim 10, wherein the method further comprises deleting the contents from the prefetch cache subsequent to providing the contents to the guest operating system.

14. The non-transitory computer readable storage medium of claim 10, wherein the method further comprises receiving address information associated with the guest operating system's swap file at the virtual machine's boot-up.

15. The non-transitory computer readable storage medium of claim 10, wherein the method further comprises prefetching contents of a plurality of pages in an order that is reverse to an order in which these pages are swapped out by the guest operating system.

16. A non-transitory computer readable storage medium storing instructions which when executed by a processor cause the processor to perform a method for reducing latency associated with accessing content of a memory page that has been evicted out of a guest operating system's buffer cache in response to a ballooning process, the method comprising:

detecting an I/O read command from the guest operating system for a full-sized page stored on a virtual disk of the virtual machine, the page having the content of the memory page;

recording a location of the full-sized page as stored on the virtual disk;

determining that the guest operating system is writing to the memory page and recording data regarding the memory page;

prefetching contents of the memory page from the recorded location on the virtual disk;

detecting that a guest operating system attempts to read at the recorded location; and     providing the prefetched content of the full-sized page to the guest operating system.

17. The non-transitory computer readable storage medium of claim 16, wherein determining that the guest operating system is writing to the memory page further comprises:

setting a write trace on the memory page, the memory page being a page in the virtual machine's physical memory, and     receiving an event signal when the guest operating system writes to the memory page.

18. The non-transitory computer readable storage medium of claim 16, wherein prefetching content of the page comprises storing content of the page in a host prefetch cache.

\* \* \* \* \*